Oct. 16, 1923. 1,470,636
L. A. NORMANDIN
POWER ATTACHMENT FOR AUTOMOBILES
Filed Feb. 20, 1922
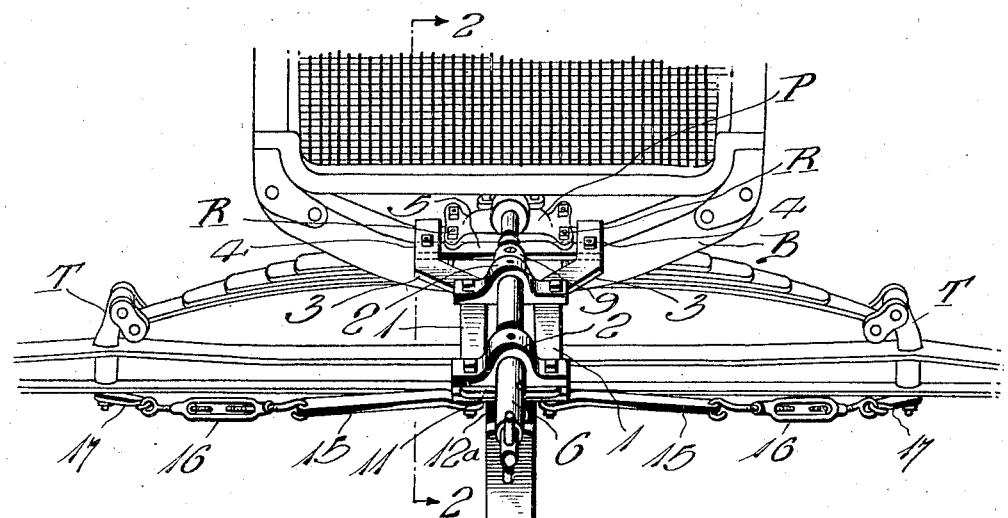
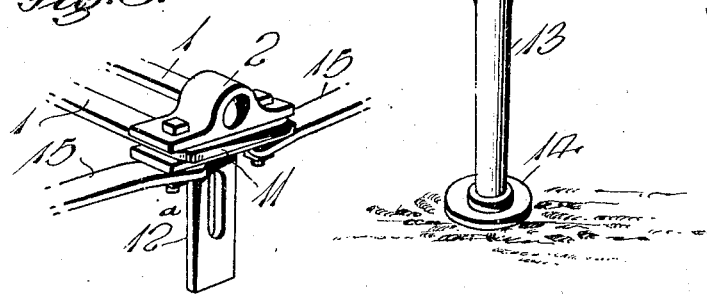
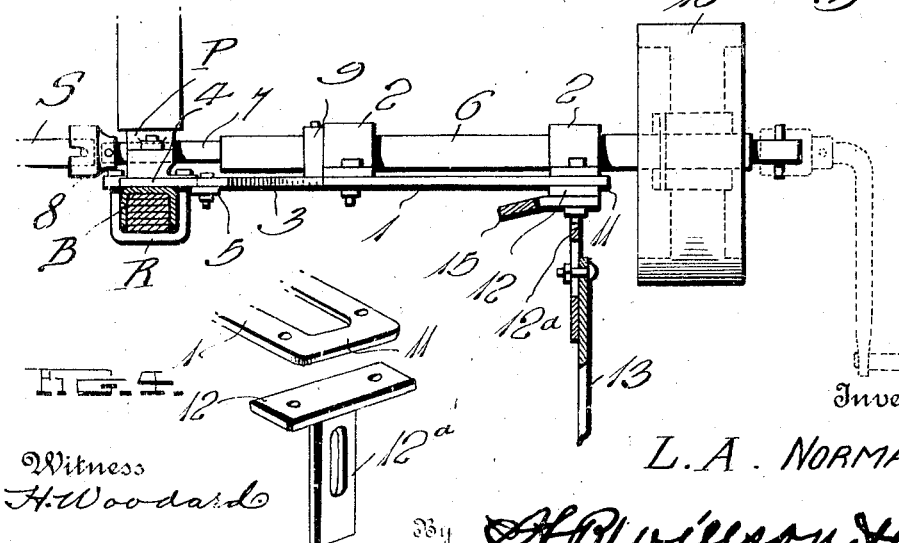
Witness
H. Woodard
Inventor
L. A. NORMANDIN
By H. B. Wilson &co.
Attorneys Patented Oct. 16, 1923.

1,470,636

UNITED STATES PATENT OFFICE.

LOUIS A. NORMANDIN, OF SWANSEA CENTER, MASSACHUSETTS.

POWER ATTACHMENT FOR AUTOMOBILES.

Application filed February 20, 1922. Serial No. 537,920.

*To all whom it may concern:*

Be it known that I, LOUIS A. NORMANDIN, a citizen of the United States, residing at Swansea Center, in the county of Bristol and State of Massachusetts, have invented certain new and useful Improvements in Power Attachments for Automobiles; and I do declare the following to be a full, clear, and exact description of the invention, such as will enable others skilled in the art to which it appertains to make and use the same.

This invention relates to an improved power attachment for automobiles which is especially, but not necessarily designed for use in connection with Fords.

The principal object of the invention is to devise an attachment of this class which includes a novel supporting frame for a rotary driven shaft, this frame being such in construction that the inner or rear end thereof is automatically interlocked with the existing parts of the automobile chassis by simply forcing it into engagement with said chassis, there being means for exerting a rearward thrust on the supporting frame to maintain it in operative position.

More specifically speaking, it is another object to so devise the supporting frame that it is provided at its inner end with an abutment designed for co-action with the projecting ears of the hand-crank bearing plate secured to the front cross-bar of the chassis, together with guides which extend beyond this abutment on opposite sides of said plate to assist in enabling the attachment to be quickly and easily set up for use.

Another object of the invention is to devise an attachment of the class described wherein the novel supporting frame is equipped with a pair of rather closely spaced alined bearings for the shaft to relieve the latter of undue strains, thereby preventing it from becoming accidentally disalined by the pull exerted thereon by the belt or other driving means co-acting with the pulley on the outer end of the shaft.

A further object of the invention is to generally improve upon attachments of the class by providing one of comparative simplicity and durability, which is strong and not liable to become easily displaced under the strain exerted thereon by the belt.

A still further object of the invention is to devise an attachment of this class embodying the aforesaid supporting frame having the abutment and guides, together with an adjustable standard for supporting the other end of the supporting frame, this standard acting in conjunction with the adjustable connections to securely maintain the abutment and guides in effective engagement with the aforesaid ears and front cross-bar of the chassis respectively.

Other objects and advantages of the invention will be apparent during the course of the following description.

In the accompanying drawings forming a part of this specification and in which like numerals are employed to designate like parts throughout the same:

Figure 1 is a front perspective view of a portion of an automobile disclosing a power attachment constructed in accordance with this invention associated therewith.

Figure 2 is a sectional view taken substantially on the plane of the line 2—2 of Fig. 1.

Figure 3 is an enlarged detail perspective view of the front shaft bearing and other details associated therewith.

Figure 4 is a view like Fig. 3 with parts removed and disconnected to illustrate the construction more clearly.

Before beginning with the detailed description of the invention I wish to emphasize at this point that the improved power attachment herein shown and to be described in detail is a decided improvement on prior patented and marketed devices of this class with which I am familiar because of the fact that it needs no direct connection, that is, the supporting frame needs no direct connection with the automobile chassis, thereby enabling all clamps and fastenings to be entirely dispensed with. The construction is such that it only requires the inner or rear end of the frame to be pushed against the U-bolts on the front cross-bar of the chassis so that the arms of the frame and cross-piece can be associated with these to provide "an interlocking connection."

For the sake of clearness of description, I have shown and will only describe those parts of the machine with which the attachment directly co-operates. To this end, the letter B designates the front cross-bar of the chassis, between the ends of which the usual hand-crank bearing plate P is connected by means of the usual U-bolts R. At this point it may be conveniently pointed out that the plate P as now constructed is such that the ears formed at the four corners project outwardly beyond the vertical sides of the bar B and advantage of this construction is taken as will appear from the following description. The only other parts which need be mentioned are the engine drive shaft S and the front supporting spring perches T.

Referring to the parts of the attachment in detail, it will be seen that the supporting frame is substantially U-shaped and includes a pair of spaced parallel bars or arms 1 partially maintained in spaced parallelism by front and rear bearings 2. Just beyond the rear bearing the bars diverge as indicated at 3 and the inner ends thereof are again bent into parallelism as at 4 and these ends constitute what may be conveniently termed "guides" in view of the fact that they serve an important function to be later described. Secured at its opposite ends to the guides some distance inward of their extremities is a cross-piece 5 which functions as an abutment. In order to insure effectiveness of operation, this abutment is secured to the under faces of these guides as clearly shown in the drawing.

A shaft 6 is rotatable in the aforesaid bearings and extends beyond these, the rearwardly extending portion being reduced as at 7 and this reduced portion extending through the existing bearing carried by the aforesaid plate P. A clutch or coupling head 8 is detachably secured to the inner end of the reduced portion for co-action with the engine drive shaft. To hold the shaft 6 coupled with the engine drive shaft, a stop collar 9 is associated with the first named shaft and co-acts with the rear bearing 2 as shown clearly in Figure 2. A suitable and relatively large pulley 10 is keyed or otherwise secured to the forwardly extending part of the shaft 6 and this pulley serves to drive a power transmission belt (not shown). In practice, the belt will be associated with any suitable kind of a machine so that the latter can derive its power from the engine shaft.

Detachably secured to the connecting portion 11 of the frame is a plate 12 having an integral depending slotted leg 12ª, and adjustably connected at its upper end with this slotted leg is a standard 13 having a base 14 at its lower end for resting on the surface. By providing an adjustable standard, the forward end of the supporting frame can be elevated to dispose the drive shaft in true horizontal alinement with the engine shaft. This adjustable standard also comes into play in securing an effective interlocking connection of the inner end of the frame with the chassis and bearing plate as will hereinafter be more clearly set forth.

It will be noted that the front bearing, plate 12, and the rearwardly inclined links 15 are all secured together by two bolts (see Fig. 3), adjustable turn buckles or the like 16 being connected with these links and in turn detachably connected with the hooked plates 17 which are secured to the aforesaid perches T as clearly disclosed in Figure 1.

In use, the supporting frame is simply forced against the automobile chassis so that the inner edge of the aforesaid abutment 5 engages the U-bolts R and extends beneath the under side of the front ears of the plate P. Of course, prior to this, the coupling head 8 must be detached from the reduced end 7 of the shaft 6 so that this end can be inserted through the bearing on the plate. Then, the coupling is replaced and engaged with the drive shaft S and after the parts are in proper position, the stop collar 9 is adjusted to prevent forward sliding of the shaft 6. During the placement of the supporting frame in operative position, the ends 4 of the bars 1 serve as guides and straddle the aforesaid plate and greatly assist in enabling the frame to be quickly arranged in operative position. These guides also serve to prevent lateral shifting of this end of the frame and when the supporting standard is adjusted to the proper elevation so that the forward end of the frame is lifted, these guides exert a downward push on the upper side of the cross-bar B while the corresponding side of the abutment is brought tightly against the under sides of the ears on the plate 2. Hence, it will be seen that the standard in addition to enabling the driven shaft to be properly alined with the engine shaft has the additional function of insuring effective interlocking connection of the inner end of the frame with the parts of the chassis mentioned. It is to be borne in mind that there is no direct connection of the frame with the cross-bar and said plate and when the device is not in use and it is desired to remove it, it can be simply slid away from the front of the machine without requiring any disconnection of fastenings or anchoring devices. It is only necessary when removing the device to detach the clutch 8 and to adjust the turn buckles 16 so that they can be quickly disengaged from the hooked plate or anchors 17. The peculiar construction of the supporting frame prevents lateral or rearward movement thereof and the connection between the forward end thereof including parts 15 to 17 prevents forward movement of the frame and serves to exert a rearward thrust thereon to maintain it in operative position. Consequently, there is little or no liability of the parts becoming displaced during the operation thereof.

By carefully considering the description in connection with the drawings, persons familiar with devices of this class will doubtless be able to obtain a clear understanding of the invention. Therefore, a more lengthy and detailed description is deemed unnecessary.

Since probably the best results may be obtained with the construction and arrangement herein shown and described, this is taken as the preferred embodiment of the invention. However, I wish it to be understood that minor changes coming within the scope of the invention as claimed may be resorted to if desired.

I claim:

1. In a device of the class described, a supporting frame for a rotary shaft including spaced arms connected together at their inner ends by a cross-piece disposed inward of the extremities of said arms, said cross-piece constituting an abutment to engage with an existing projecting part, and the portions of the arms extending beyond said cross-piece forming spaced guides for disposition on opposite sides of said part, said guides being adapted to bear downwardly on another part of the chassis, and means cooperative with the outer end of said frame for binding said guides and abutment tightly against the respective parts which they engage.

2. The structure set forth in claim 1, wherein said means cooperating with the outer end of the frame is an adjustable leg adapted to rest on the ground.

3. A power attachment for motor vehicles comprising a substantially U-shaped supporting frame adapted for horizontal disposition in front of the vehicle, the free ends of the arms of said frame being directed away from each other and then directed to extend in parallelism to provide guides for disposition on opposite sides of an existing bearing plate on the vehicle, said guides being adapted to bear downwardly on the front cross bar of the chassis, a cross piece secured to said arms, being disposed inward of the extremities thereof and constituting an abutment to engage beneath the projecting portions of said bearing plate, a bracket at the other end of said frame, said bracket embodying a horizontally disposed plate-like part and a depending slotted part, bearings for a rotary shaft secured to said frame, one of said bearings being disposed at the outer end thereof, and connecting devices intended to be secured at their inner ends to a part of the vehicle, said connecting devices embodying links, and fastenings passing through said last named bearing, frame, plate-like part of the bracket and then through said links.

4. A power attachment for motor vehicles including a one-piece substantially U-shaped frame adapted for horizontal disposition in front of the vehicle chassis, the free inner end portions of the arms of said frame being directed laterally away from each other on an angle to dispose them in substantial divergent relation, the extremities of said divergent portions being bent in a direction to dispose them in spaced parallelism to provide a pair of guides for disposition on opposite sides of an existing bearing plate fitted on said chassis, said guides being adapted to bear downwardly on the front crossbar of the chassis, and a cross-piece secured to the guides, said cross-piece being disposed inward of the extremities of the guides and forming an abutment to engage beneath projecting portions on said bearing plate.

In testimony whereof I have hereunto set my hand.

LOUIS A. NORMANDIN.